United States Patent Office 2,859,467
Patented Nov. 11, 1958

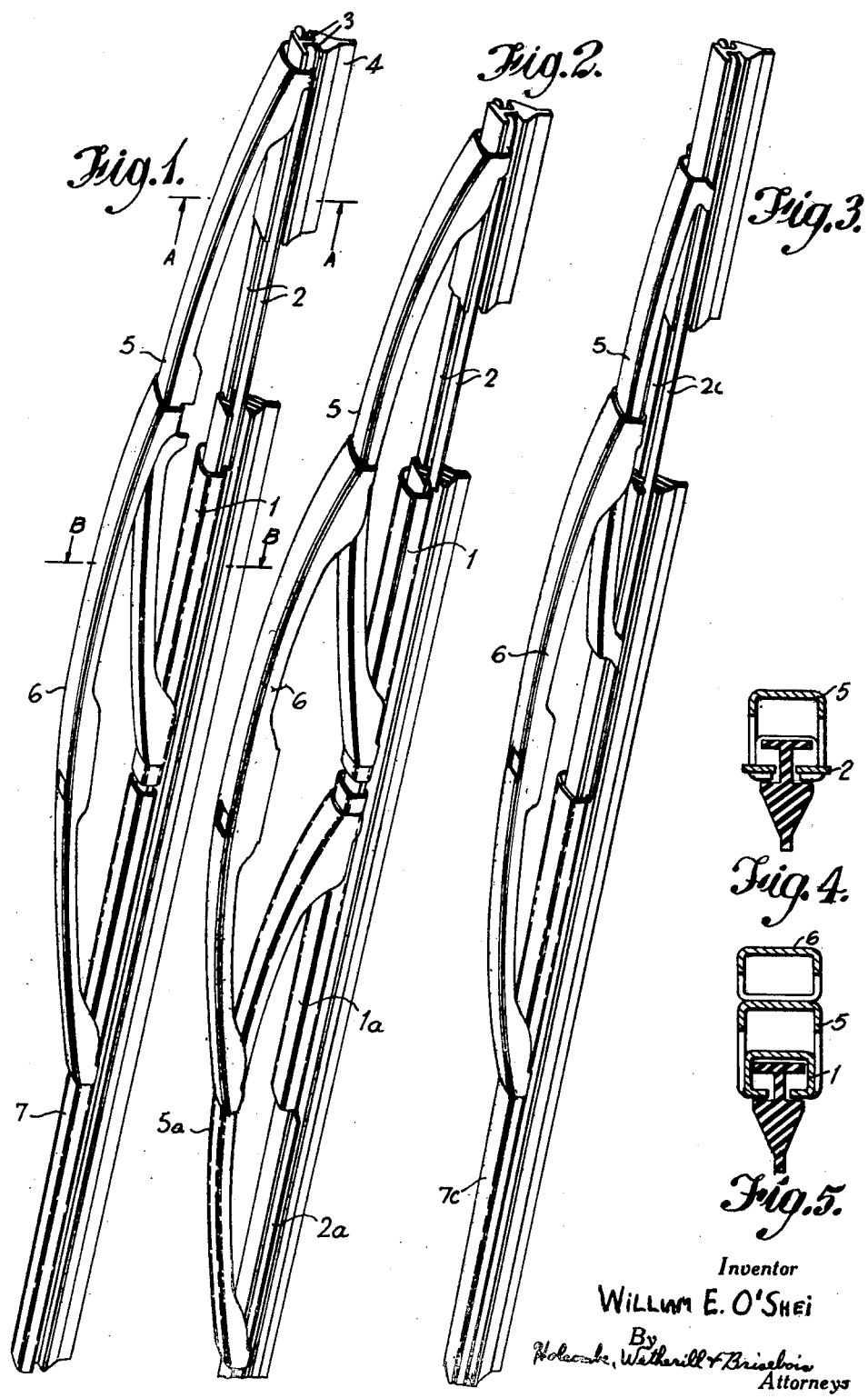

2,859,467

WINDSCREEN WIPER BLADES

William Edward O'Shei, London, England

Application January 20, 1955, Serial No. 483,132

4 Claims. (Cl. 15—245)

The specification of my Patent No. 2,739,337 dated March 27, 1956, describes a windscreen wiper blade which is capable of wiping curved windscreens.

The present tendency in automobile design is to provide curved windscreens which are, in the horizontal direction, more appreciably curved at their outer zones than across the major part of their width, the curvature in the vertical direction being very slight or zero.

The present invention has for its object to provide a modification of the windscreen wiper blade described in the aforesaid patent which enables the blade to flex to a greater curvature at its outer end, that is at the end remote from the shaft about which the wiper arm swings, whereby the wiper blade can more efficiently wipe around the curved outer zone of a windscreen.

To this end, according to the invention, the channel backing member which extends towards the outer end of the blade is made flexible in the plane of the squeegee part-way along its length towards said outer end, said backing member being equipped with a yoke, one end of which connects with the backing member adjacent its outer end and the other end of which connects with the backing member at a point spaced from said outer end, an intermediate point of the yoke being connected to one end of the bridge-piece which is provided with means for attaching the wiper blade assembly to the wiper arm.

In order that the invention may be more clearly understood, reference will now be made to the accompanying drawings in which:

Figures 1, 2 and 3 are perspective views, partly cut away, of three alternative constructions of wiper blade according to this invention.

Figures 4 and 5 are sections along the lines A—A B—B in Figure 1 respectively.

Figure 1 shows a modification of the wiper blade shown in Figure 4 of the aforementioned patent in which however the channel-shaped backing members 1 and 7 are made of metal instead of from synthetic resin plastic material. The flanges of the backing members fit into the wide grooves 3 extending along opposite sides of the squeegee element 4, the arrangement being such that the rear of the squeegee element can move into and out of the backing members as it conforms with the curvature of the windscreen in the manner describd in the aforesaid patent.

According to this invention, the outer backing member 1 is modified by having a portion of the channel removed for a part of the length of the backing member adjacent the outer end thereof (for example about half-way therealong) so as to leave only the two inwardly directed metal flanges 2 which thus constitute flexors extending into the grooves 3. Fitted to the backing member 1 is a yoke 5, one end of which is attached adjacent the free end of the two flexors 2 and the opposite end of which is connected adjacent the opposite end of the backing member 1, the connections between the ends of the yoke and the backing member permitting relative longitudinal movement therebetween, at least at one end, so that the backing member can flex into the yoke. A bridge-piece 6 extends between the backing member 7 and an intermediate point on the yoke 5 and is provided with means for attaching it to a wiper arm.

The wiper blade operates substantially as described in the aforesaid specification with the additional feature that the outer backing member 1 can move into the yoke 5 and the flexor portions 2 can flex to achieve a greater degree of curvature at the outer end of the blade than is possible with the blade described in the aforesaid specification.

In a modification, as shown in Fig. 2, both backing members 1, 1a may have the modified construction above described, that is partly rigid and partly flexible, each being provided with a yoke 5, 5a, and intermediate points on the two yokes being connected to opposite ends of the bridge-piece 6.

In a further modification, the outer backing member may be made flexible throughout its length, instead of partly rigid and partly flexible. The outer backing member may comprise, for example, a pair of metal strips 2c arranged to extend along the grooves at opposite sides of the squeegee element, the strips being carried by a yoke 5 which in turn is connected to the other backing member 7c by a bridge-piece 6. If desired the said two flexible strips 2c may, as shown in Fig. 3, be formed integrally with the other backing member 7c, for example as extensions of the inwardly directed flanges of the rigid backing member 7c.

Whilst particular embodiments have been described, it will be understood that various modifications may be made without departing from the scope of the invention.

I claim:

1. A windscreen wiper blade comprising a squeegee element, grooves extending longitudinally of the squeegee element along opposite sides thereof and adjacent the rear thereof, a first backing member of rigid channel-shaped cross-section extending part-way along the back of the squeegee element, the free edges of said rigid channel-shaped backing member having inwardly directed flanges extending into the grooves on opposite sides of the squeegee element, a second backing member extending part-way along the squeegee element and being constructed for part of its length of rigid channel form with inwardly directed flanges along its free edges which extend into said grooves and for the remaining part of its length by flexible extensions of said flanges, said flexible extensions also extending into said grooves, a yoke member connected adjacent opposite ends of said second backing member, and a bridge-piece interconnecting intermediate points on said first backing member and said yoke.

2. A windscreen wiper blade comprising a squeegee element, grooves extending longitudinally of the squeegee element along opposite sides thereof and adjacent the rear thereof, two backing members extending along the back of the squeegee element, each said backing member being constructed for part of its length of rigid channel form with inwardly directed flanges along its free edges which extend into said grooves and for the remaining part of its length by flexible extensions of said flanges, said flexible extensions also extending into said grooves, two yoke members connected adjacent opposite ends of said backing members respectively and a bridge-piece interconnecting intermediate points on said yokes.

3. A windscreen wiper blade comprising a squeegee element, grooves extending longitudinally of the squeegee element along opposite sides thereof and adjacent the rear thereof, a backing member extending along the back of the squeegee element, said backing member being constructed for part of its length of rigid channel form with inwardly directed flanges along its free edges which extend into said grooves and for the remaining part of its length by flexible extensions of said flanges, said flexible extensions also extending into said grooves, a yoke member one end of which connects with the flexible extensions adjacent their free ends and the other end of which connects with the backing member at a point spaced from said free ends; and a bridge-piece interconnecting an intermediate point on said yoke and an intermediate point of the rigid part of the backing member.

4. A windscreen wiper blade comprising a squeegee element, grooves extending longitudinally of the squeegee element along opposite sides thereof and adjacent the rear thereof, a backing member extending at least part way along the squeegee element and being constructed for part of its length of rigid channel form with inwardly directed flanges along its free edges which extend into said grooves and for the remaining part of its length by flexible extensions of said flanges, said flexible extensions also extending into said grooves, and a yoke member connecting said flexible extensions to said rigid channel form part of the backing member.

References Cited in the file of this patent

UNITED STATES PATENTS

| | | |
|---|---|---|
| 2,303,694 | Horton | Dec. 1, 1942 |
| 2,596,063 | Anderson | May 6, 1952 |
| 2,657,415 | Rappl | Nov. 3, 1953 |
| 2,664,583 | Oishei | Jan. 5, 1954 |
| 2,739,337 | O'Shei | Aug. 4, 1956 |

FOREIGN PATENTS

| | | |
|---|---|---|
| 1,051,298 | France | Sept. 16, 1953 |